United States Patent [19]

Hanson et al.

[11] Patent Number: 4,872,342
[45] Date of Patent: Oct. 10, 1989

[54] TRANSLATIONAL ACCELEROMETER AND ACCELEROMETER ASSEMBLY METHOD

[75] Inventors: Richard A. Hanson; Rex B. Peters, both of Woodinville; Brian L. Norling, Mill Creek; Edward A. Urbach, Duvall, all of Wash.

[73] Assignee: Sundstrand Data Control, Inc., Redmond, Wash.

[21] Appl. No.: 222,680

[22] Filed: Jul. 21, 1988

Related U.S. Application Data

[63] Continuation of Ser. No. 65,432, Jun. 23, 1987, abandoned, which is a continuation-in-part of Ser. No. 879,473, Jun. 27, 1986, abandoned.

[51] Int. Cl.$^4$ ............................................. G01P 15/08
[52] U.S. Cl. ............................ 73/517 R; 73/517 AV; 29/595
[58] Field of Search ...................... 73/510, 514, 517 R, 73/517 AV, 517 B, 517 A, 497; 310/329; 29/25, 35, 418, 423, 595, 610 SG

[56] References Cited

U.S. PATENT DOCUMENTS

| | | | |
|---|---|---|---|
| 3,498,138 | 9/1966 | Stewart | 73/517 B |
| 4,071,838 | 1/1978 | Block | 73/517 R |
| 4,182,187 | 1/1980 | Hanson | 73/497 |
| 4,414,848 | 11/1983 | Shutt | 73/497 |
| 4,498,342 | 2/1985 | Aske | 73/517 B |
| 4,553,436 | 11/1985 | Hansson | 73/517 R |

Primary Examiner—John Chapman
Attorney, Agent, or Firm—Michael S. Yatsko; Trevor B. Joike

[57] ABSTRACT

An accelerometer comprising a body (10, 16, 12), a proof mass (18, 30, 32), a mounting strucutre comprising flexures (20, 22) for mounting the proof mass to the body, and force sensing elements (34, 38). The flexures permit translational motion of the proof mass with respect to the body along a sensitive axis SA and rotation of the proof mass with respect to the body about a hinge axis HA that is perpendicular to the sensitive axis. Acceleration of the accelerometer along the sensitive axis results in translational motion of the proof mass along the sensitive axis. The force sensing elements reacts to such translational motion by producing a signal indicative of acceleration along the sensitive axis. In a preferred embodiment, the mounting structure comprises a pair of fused quartz flexures that are oppositely directed with respect to one another, and the force sensing elements comprise a pair of vibrating beam force transducers that are connected to the proof mass on opposite sides of the hinge axis from one another. The described assembly method for accelerometers comprises forming bridges between the proof mass and body, the bridges being removed after attachment of the force sensing elements.

40 Claims, 6 Drawing Sheets

TRANSLATIONAL ACCELEROMETER AND ACCELEROMETER ASSEMBLY METHOD

RELATED APPLICATIONS

This application is a continuation application based on prior copending application Ser. No. 065,432, filed on June 23, 1987, abandoned, which in turn is a continuation in part of U.S. Ser. No. 879,473, filed June 27, 1986 abandoned.

FIELD OF THE INVENTION

The present invention relates to accelerometers and, in particular, to high performance accelerometers suitable for use in inertial navigation systems.

BACKGROUND OF THE INVENTION

An example of a prior art accelerometer design with high performance potential is described in U.S. Pat. No. 3,702,073. The accelerometer shown in that patent comprises three primary components, namely, a proof mass assembly and upper and lower stators between which the proof mass assembly is supported. The proof mass assembly includes a movable reed that is suspended via flexure elements to an outer annular support member. The reed and outer annular support member are commonly provided as a unitary structure composed of fused quartz.

Both upper and lower surfaces of the reed include capacitor plates and force restoring coils. Each force restoring coil is positioned on the reed such that the central axis of the coil coincides with a line that extends through the center of the reed and that is normal to the top and bottom surfaces of the reed. This line is coincident with the sensitive axis of the accelerometer. A plurality of mounting pads are formed at spaced apart positions around the upper and lower surfaces of the annular support ring. These mounting pads mate with inwardly facing surfaces of the upper and lower stators when the accelerometer is assembled.

Each stator is generally cylindrical, and has a bore provided in its inwardly facing surface. Contained within the bore is a permanent magnet. The bore and permanent magnet are configured such that an associated one of the force restoring coils of the proof mass assembly fits within the bore, with the permanent magnet being positioned within the cylindrical core of the force restoring coil. Current flowing through the coil therefore produces a magnetic field that interacts with the permanent magnet to produce a force on the reed. Also provided on the inwardly facing surfaces of the stators are capacitor plates configured to form capacitors with the upper and lower capacitor plates on the reed. Thus, movement of the reed with respect to the upper and lower stators results in a differential capacitance change.

In operation, the accelerometer is affixed to an object whose acceleration is to be measured. Acceleration of the object along the sensitive axis results in pendulous, rotational displacement of the reed and coils with respect to the support ring and the stators. The resulting differential capacitance change caused by this displacement is sensed by a suitable feedback circuit. The feedback circuit then produces a current that, when applied to the forces restoring coils, tends to return the reed to its neutral position. The magnitude of the current required to maintain the reed in its neutral position is directly related to the acceleration along the sensitive axis.

One of the most significant advantages of the accelerometer described above is that the reed, flexures and annular support member may be fabricated from a single piece of fused quartz, resulting in flexures with very high bias stability. A significant disadvantage of this accelerometer design is that the output is an analog signal. The accelerometer output signal must therefore be processed by a digital-to-analog converter or voltage-to-frequency converter prior to being used in a digital system. A comparatively new type of accelerometer that has an inherently digital output is the vibrating beam accelerometer, or VBA. The VBA is one member of a class of sensors that uses a force sensitive, crystal controlled oscillator as a force-to-frequency converter. In the case of the VBA, the force measured is the force required to accelerate a proof mass, and the oscillating crystal in a slender beam mechanically loaded along its longitudinal axis while being oscillated transversely in a beam bending mode. Just as the transverse component of restoring force in a guitar string will vary its frequency as a function of tension, so the axial force on an oscillating beam will vary its frequency as a function of tension or compression. The beam has a fixed frequency, determined by its mass and elastic properties, at which it oscillates under zero longitudinal load. Tension will increase that frequency, while compression will decrease it.

The VBA shares a design characteristic with all other sensors that depend on vibrating elements, in that spurious results can be obtained if significant amounts of vibratory energy are allowed to leave the system. In a VBA, the common soluton to this problem is to use a crystal that consists of two slender side-by-side beams, separated by a narrow central slot except at the beam ends wherein they merge into a common surface for attachment to associated structures. Gold electrodes are applied to the surfaces of the beams, such that the piezoelectric properties of the crystal material may be used to excite the twin beams into resonance in a transverse oscillation mode in which the two beams move in their common plane 180° out of phase with one another. In this mode, the tight coupling between the end portions of the beams due to the very narrow slot causes them to resonante as a single structure at a single frequency, while the opposed stress fields associated with the bending moments at the ends of the beams merge and rapidly disappear, and are therefore not transmitted into surrounding structures.

All VBAs possess a number of significant advantages, including excellent scale factor stability. Many error sources can be greatly reduced by using two proof masses and two sensing crystals operated in a push-pull configuration, such that one crystal is put in compression while the other is put in tension, and treatng the output as some function of the frequency difference. This method of measurement cancels out many common mode errors, including the contribution of force crystal nonlinearity to the vibration rectification coefficient (VRC). However, a disadvantage of the use of dual proof masses is that identity of dynamic repsonse is difficult to achieve at frequencies approaching the sensor natural frequencies. An additional potential disadvantage of VBAs is that the proof mass requires caging to protect the crystal elements against shock overloads. Caging can be made difficult by full scale deflection on the order of 100 microinches. Shock caging is also sensitive to mismatches in coefficients of thermal expansion.

The crystal used as a force-to-frequency conversion element in a VBA can respond to forces only in one direction. This feature requires that the proof mass to which the crystal is attached have at least four of its six possible degrees of freedom relative to the instrument case constrained by some means. Although many constraints have been tried, it is generally considered that flexures provide the optimum means of proof mass constraint. In general, VBAs designed to date have made use of flexure that constrains the proof mass to a single degree of freedom, i.e., rotational motion about a hinge axis passing through the flexures. The force sensing crystal is attached to the proof mass, typically at its center of mass or at the end of the proof mass opposite the flexure, and extends in a direction normal to the hinge axis and to the pendulous axis. The force sensing crystal is therefore tangent to the circular arc to which the proof mass is constrained by the flexure.

SUMMARY OF THE INVENTION

The present invention provides an accelerometer in which the proof mass is mounted such that it has two degrees of freedom, i.e., the proof mass can move translationally along the sensitive axis and can rotate about a hinge axis normal to the sensitive axis. In a preferred embodiment, the accelerometer combines the long term stability of fused quartz flexures with the inherently digital characteristics of crystalline quartz force sensors. The present invention also provides an improved accelerometer assembly method that is applicable both to the accelerometer of the present invention and other accelerometers in which a force transducer is connected to a proof mass.

In a preferred embodiment, the accelerometer of the present invention comprises a body, a proof mass, mounting means for mounting the proof mass to the body, and sensing means. The mounting means comprises a pair of flexures that permit translational motion of the proof mass along the sensitive axis, and rotation of the proof mass about a hinge axis perpendicular to the sensitive axis. The flexures are positioned on opposite sides of a pendulous axis that is normal to the hinge and sensitive axes and that passes through the center of mass of the proof mass. Acceleration along the sensitive axis results in translational motion of the proof mass along the sensitive axis. The sensing means reacts to such motion by producing a signal indicative of the acceleration. The sensing means preferably comprises two force sensing elements connected to the proof mass on opposite sides of the hinge axis.

DETAILED DESCRIPTION OF THE INVENTION

Figure 1:
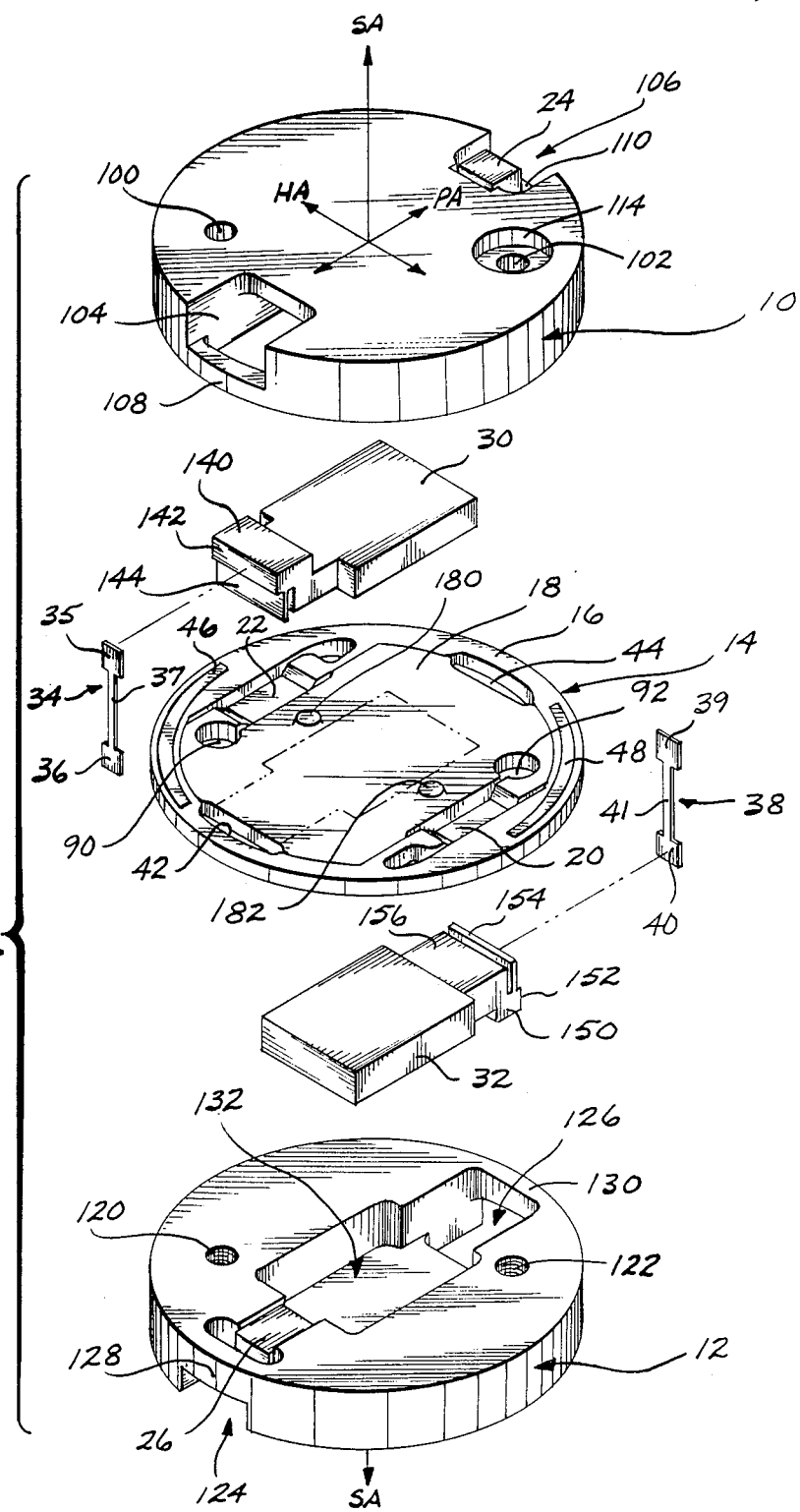
FIG. 1 is an exploded perspective view of a preferred embodiment of the accelerometer of the present invention.

FIG. 1 presents an exploded perspective view of one preferred embodiment of the accelerometer of the present invention. The accelerometer includes upper frame 10 and lower frame 12, between which quartz reed assembly 14 is supported. The accelerometer as a whole has a generally cylindrical shape in which the central axis of the cylinder is coincident with sensitive axis SA. The reed assembly includes annular support 16 from which proof mass base 18 is supported by flexures 20 and 22. The flexures permit translation of proof mass base 18 along sensitive axis SA, and rotation of the proof mass base about hinge axis HA that is normal to the sensitive axis and parallel to the plane of reed assembly 14. Weight 30 is secured to the upper surface of proof mass base 18, and weight 32 is secured to the lower surface of the proof mass base. Weights 30 and 32 and the proof mass base therefore move as a unit, and this unit is hereafter referred to as the proof mass.

The accelerometer of FIG. 1 further includes quartz force sensing crystals 34 and 38. Crystal 34 comprises end sections 35 and 36 interconnected by center section 37. Center sections 37 comprises a pair of closely spaced beams that are caused to vibrate in the plane of the beams, 180° out of phase with one another. End section 35 is connected to weight 30, and end section 36 is connected to mounting block 26 that in turn is connected to lower frame 12. Crystal 38 is preferably identical to crystal 34, and comprises end sections 39 and 40 and center section 41. End section 39 is connected to mounting block 24 that in turn is connected to upper frame 10, and end section 40 is connected to weight 32. The center section 37 of crystal 34 passes through opening 42 in reed assembly 14, and center section 41 of crystal 38 passes through opening 44 in reed assembly 14. The upper surface of annular support 16 includes raised mounting pads 46 and 48 symmetrically disposed on opposite sides of the reed asembly from one another. The lower surface of annular support 16 includes a similar pair of mounting pads. Aside from crystals 34 and 38, the mounting pads provide the only points of contact between reed assembly 14 and the upper and lower frames. Pads 46 and 48 are both elongated in the circumferential direction and narrow in the radial direction, an arrangement that minimizes the coupling of dishing forces into the flexures.

Figure 2:
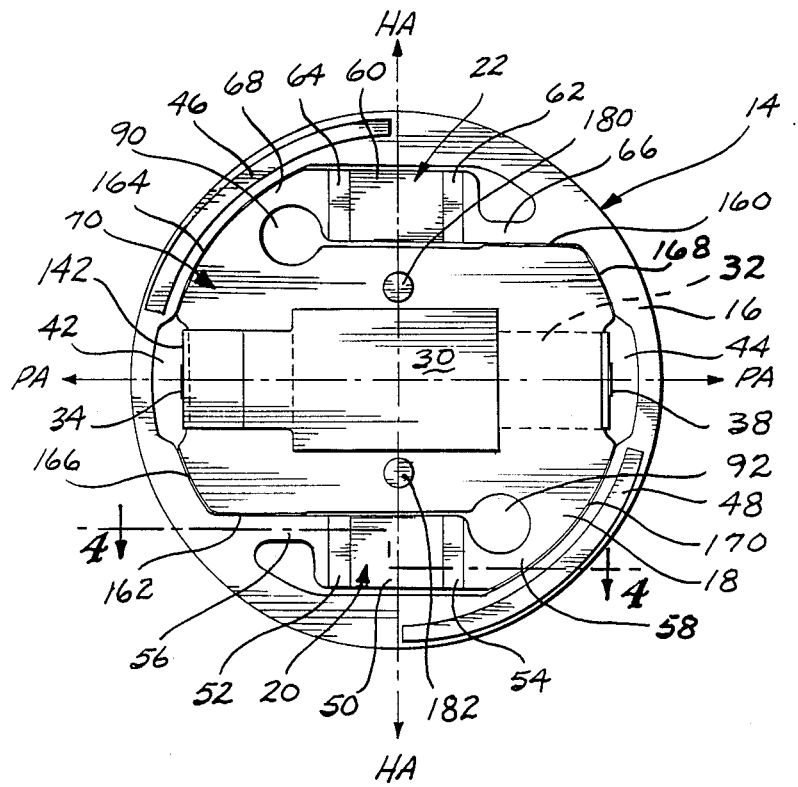
FIG. 2 is a top plan view of the reed assembly.
Figure 3:
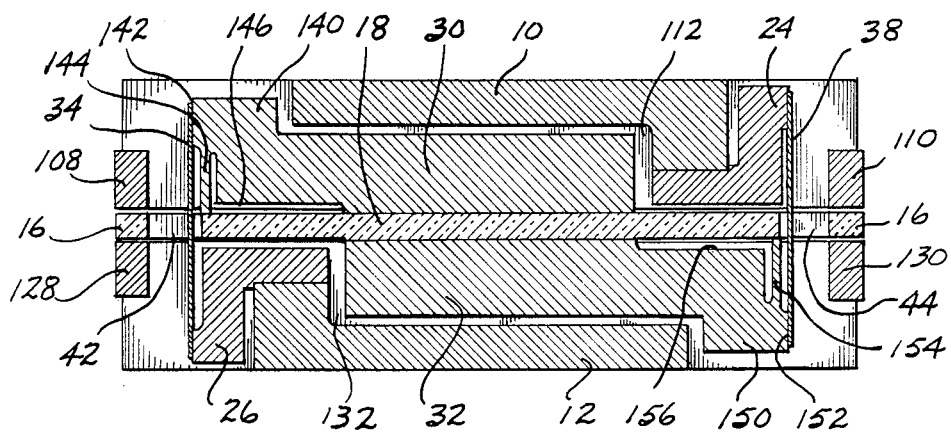
FIG. 3 is a cross-sectional view of the accelerometer of FIG. 1 taken in the plane defined by sensitive axis SA and pendulous axis PA.
Figure 4:
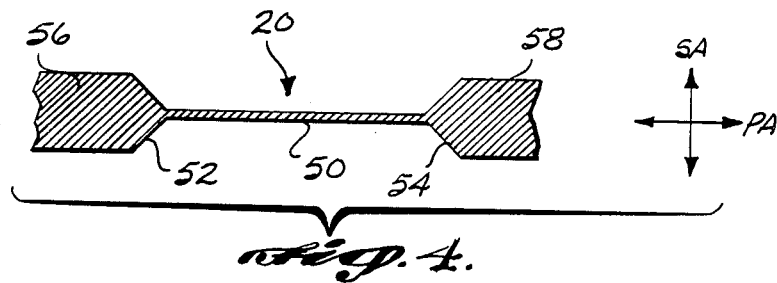
FIG. 4 is a cross-sectional view taken along the line 4-4 of FIG. 2.

Reed assembly 14 is illustrated in greater detail in FIGS. 2-4. With particular reference to flexure 20 shown in FIGS. 2 and 4, the flexure is a flat leaf flexure comprising a thin central leaf 50 flanked by tapered sections 52 and 54. As used herein, the term leaf member or leaf flexure denotes a flexure having a width sufficient to carry loads in shear with minimal compliance, i.e., a flexure having sufficient width to resist lateral forces (along the hinge axis) without allowing the ends of the flexures to rotate sufficiently to increase the spring rate while under such a lateral load. Tapered section 52 comprises the end of arm 56 that extends inward from annular support 16. Tapered section 54 comprises the end of arm 58 that extends from proof mass base 18. Flexure 22 is identical to flexure 20, except that it faces in the opposite direction, i.e., the points of connection of flexures 20 and 22 to annular support 16 are on opposite sides of hinge axis HA with rsepect to one another. The points of connection of the flexures to the proof mass base are similarly on opposite sides of the hinge axis from one another. Flexure 22 comprises central leaf 60, flanked by tapered sections 62 and 64. Tapered section 62 comprises the end of arm 66 that extends inward from annular support 16, and tapered section 64 comprises one end of arm 68 that extends from proof mass base 18.

Figure 5:
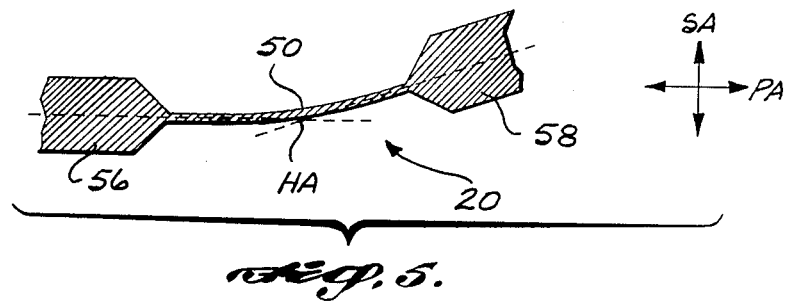
FIG. 5 is a schematic view showing rotation about hinge axis HA.
Figure 6:
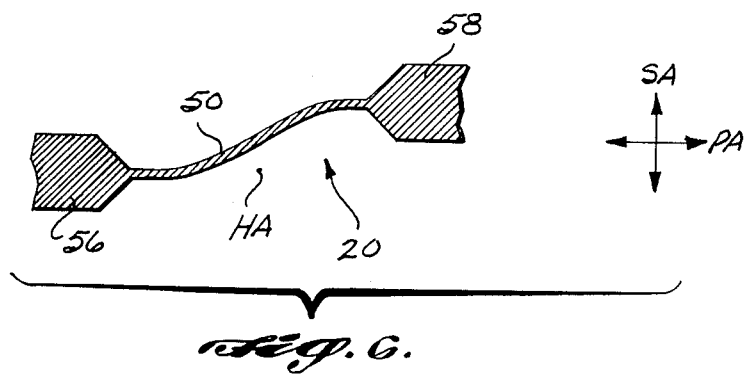
FIG. 6 is a schematic view showing translation along sensitive axis SA.

Flat leaf flexures of the type shown in FIGS. 2 and 4 permit two distinct types of proof mass motion. The first type of motion, termed angular bending, is illustrated in exaggerated form in FIG. 5 for flexure 20, and consists of rotation of the proof mass base and arm 58 with respect to the annular support and arm 56. For comparatively small deflections, the effective center of rotation is at hinge axis HA that is positioned at the intersection of the centerlines of arms 56 and 58. The second type of motion permitted by flexure 20 is illustrated in exaggerated form in FIG. 6, and consists of translation of the proof mass base and arm 58 with respect to the annular support and arm 56, the direction of translation being normal to the reed assembly and parallel to sensitive axis SA of the accelerometer. The deflection shown in FIG. 6 is commonly referred to as S-bending deflection. Therefore, unlike conventional flexures that permit a single, rotational degree of freedom, the flexures utilized in the present invention provide two degrees of freedom, a rotational motion about a hinge axis that lies in the plane of the reed assembly, and translational motion normal to the plane of the reed assembly and parallel to the sensitive axis of the accelerometer. With reference to FIG. 2, it will be seen that flexures 20 and 22 are aligned with one another in a left to right sense, as viewed in FIG. 2, and the hinge axes of flexures 20 and 22 therefore coincide, such that the entire proof mass rotates about a single hinge axis HA that is common to both flexures. The pendulous axis PA of the proof mass is perpendicular to hinge axis HA, is in the plane of annular support 16, and passes through the centerlines of crystals 34 and 38.

Other arrangements of flexures 20 and 22 may be used within the broad scope of the present invention. For example, flexure 22 may be reversed from left to right, such that in FIG. 2, the right hand ends of both flexures are connected to proof mass base 18. However, as more fully described below, the use of oppositely directed flexures eliminates a potential cross-coupling effect, and also provides a third axis of shock caging. Oppositely directed flexures are therefore preferred for most applications.

Figure 7:
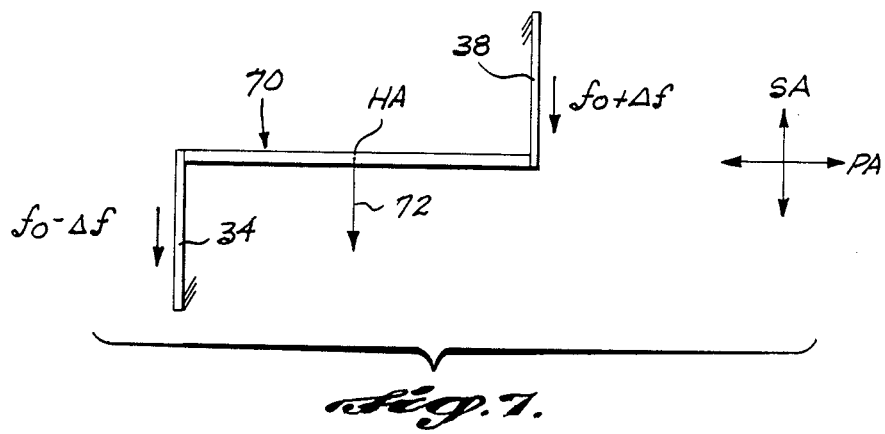
FIG. 7 is a schematic view showing the effect of acceleration on the quartz crystals.
Figure 8:
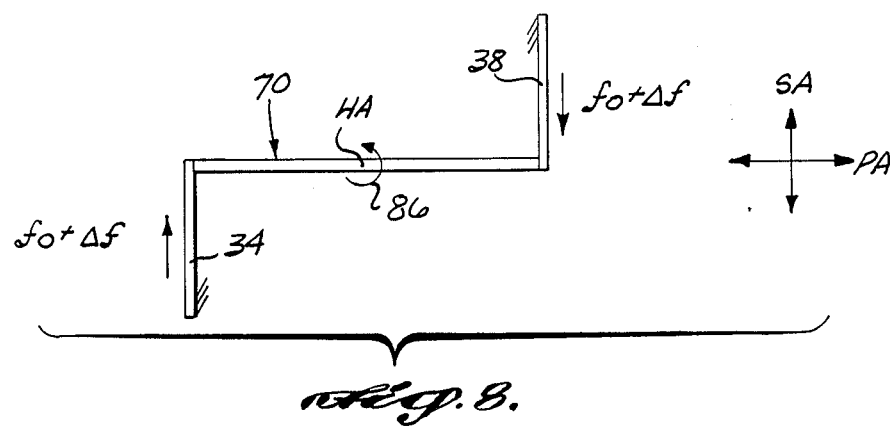
FIG. 8 is a schematic view showing the effect of differential thermal expansion on the quartz crystals.

The operation of the accelerometer of FIGS. 1-3 is illustrated in FIGS. 7 and 8. FIG. 7 shows proof mass 70 (corresponding to proof mass bas 18 and weights 30 and 32) having crystal 34 fastened to one end and crystal 38 fastened to its opposite end along pendulous axis PA.

The flexures, not shown in FIG. 7, permit proof mass 70 to translate upward or downward along sensitive axis SA and to rotate about hinge axis HA. For simplicity, it will be assumed in the present discussion that the center of mass of proof mass 70 is located midway between crystals 34 and 38, at the intersection of pendulous axis PA and hinge axis HA. Hinge axis HA is directed out of the plane of the drawings in FIG. 7.

In the arrangement shown in FIG. 7, assume that the structure to which the accelerometer is secured is accelerated in an upward direction. As a result, in a frame of reference of the accelerometer, proof mass 70 will experience a downward deflection, indicated by arrow 72, resulting in downward forces on crystals 34 and 38. The downward force exerted by proof mass 70 on crystal 34 compresses the crystal, and thereby lowers the crystal's resonant frequency. Assume that crystal 34 oscillates at frequency $f_0$ in the absence of an applied force, and that the compression indicated in FIG. 7 causes the crystal's resonant frequency to change to $f_0 - \Delta f$. The downward force exerted by proof mass 70 on crystal 38 puts crystal 38 in tension and, as a result, the resonant frequency of crystal 38 increases to $f_0 + \Delta f$. In this simplified example, it has been assumed that the zero load frequency $f_0$ is the same for both crystals, and that the magnitude of the change $\Delta f$ is also the same for both crystals.

Figure 9:
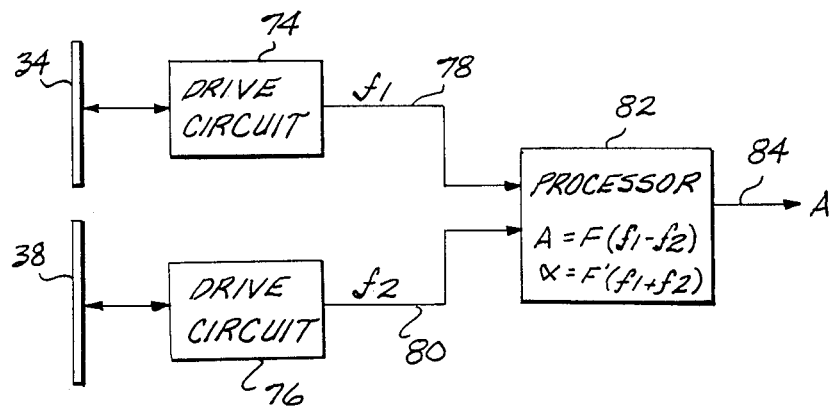
FIG. 9 is a schematic view of a frequency difference technique for determining acceleration using a pair of quartz crystals.

Crystals 34 and 38 are connected in a known type of acceleration measuring circuit that is schematically illustrated in FIG. 9. Crystal 34 includes electrodes deposited on its surface that are electrically connected to drive circuit 74. The drive circuit provides the energy for vibrating crystal 34, and produces an output signal on line 78 having a frequency $f_1$ equal to the crystal oscillation frequency. Similarly, drive circuit 76 is electrically coupled to crystal 38, and produces an output signal on line 80 having a frequency $f_2$ equal to the oscillation frequency of crystal 38. The signals on line 78 and 80 are input to processor 82 that determines the acceleration (A) as some function of the frequency difference $f_1 - f_2$, and that produces a signal representing such acceleration on line 84. Further information concerning such an acceleration measuring circuit may be found in U.S. Pat. No. 4,467,651. With reference to FIG. 7, it may be seen that the linear acceleration along sensitive axis SA will result in signals on lines 78 and 80 having frequencies $f_0 - \Delta f$ and $f_0 + \Delta f$ respectively, such that the frequency difference $f_1 - f_2$ will be equal to $2\Delta f$. The frequency changes of both crystals therefore combine to produce the acceleration signal. The total frequency difference $2\Delta f$ will be as large as for a single crystal device connected to the same proof mass.

Inspection of FIGS. 7 and 8 shows that if the accelerometer is subjected to an angular acceleration, the frequencies $f_1$ and $f_2$ will either both increase or both decrease. Thus as a result of the symmetry of the accelerometer, angular acceleration $\alpha$ can also be obtained by processor 82 as a function of the frequency sum $f_1 + f_2$. In particular, if it is assumed that each crystal 34 and 38 has the following force (F) to frequency (f) characteristic:

$$f = f_0 + K_1 F$$

where $f_0$ and $K_1$ are constants, then it can be shown that the angular acceleration $\alpha$ is given by $$\alpha = \frac{f_1 + f_2}{K_1 \, J/R}$$

where J is the moment of inertia of the proof mass about its own center of mass, and R is the distance from the proof mass center of mass to the crystal attachment point. In determining angular acceleration, there is no cancellation of even order nonlinearities, so processing must be done as for a single force sensing crystal design. As in the single crystal design, static linearization is not a problem, but clock errors and rectification errors may be large. If there are accuracy limitations, then it will in general be necessary to use a highly stable clock and/or a very high sampling rate.

FIG. 8 illustrates the insensitivity of the accelerometer of the present invention to thermal effects. The components of the accelerometer are of necessity composed of materials having different coefficients of thermal expansion. Read assembly 14 is preferably composed of fused or amorphous quartz, a substance having a coefficient of thermal expansion that is essentially zero. Crystals 34 and 38 are composed of crystalline quartz, a substance having a comparatively high coefficient of thermal expansion. Intermediate components must therefore accommodate these two quite different materials. Weights 30 and 32 and mounting blocks 24 and 26 are preferably composed of beryllium copper, a material having a comparatively high coefficient of thermal expansion, approximately equal to that of crystalline quartz. Upper frame 10 and lower frame 12, aside from mounting blocks 24 and 26, are preferably composed of Invar alloy, an iron-nickel alloy having a very low coefficient of thermal expansion, approximately one-tenth that of beryllium copper.

As the temperature of the accelerometer changes, the dimensions of crystals 34 and 38 and mounting blocks 24 and 26 change to a greater extent than do the dimensions of the other components of the accelerometer. The effect of such change is illustrated in FIG. 8. It is assumed that the temperature of the accelerometer has been lowered, and as a result crystals 34 and 38 contract and rotate proof mass 70 in the direction indicated by arrow 86 about hinge axis HA. The flexures supporting proof mass 70 will resist this rotation, resulting in a rotational force in the opposite direction from arrow 86, producing a tension force on crystal 34 and a similar tension force on crystal 38. These forces will typically be quite small for the illustrated embodiment having leaf flexures, since the rotational stiffness of such flexure is quite small compared to their translational stiffness. As a result of these forces, the signals on lines 78 and 80 (FIG. 9) will both have frequencies of $f_0 + \Delta f$, and the frequency difference $f_1 - f_2$ will therefore be zero. As a result, in the first approximation, temperature effects do not produce scale factor or bias errors in the determination of acceleration.

Reed assembly 14, as shown for example in FIG. 2, could be utilized in a closed loop accelerometer of the type described in U.S. Pat. No. 3,702,073. In such an embodiment, the upper and lower surfaces of the proof mass would include capacitor plates, each capacitor plate forming a capacitor with the adjacent frame. The capacitors would be connected to a pick-up circuit for measuring proof mass motion along the sensitive axis. In response to a signal indicating such motion, a force balancing system would return the proof mass to its null position, and the strength of the signal driving the force balancing system would then be a measure of the acceleration. A suitable force balancing system would include magnetic and electrostatic force balancing arrangements. In a closed loop system, a dual servo system may be required to prevent rotation of the proof mass. Alternately, force crystals could be used to provide both the pickoff function and to prevent proof mass rotation.

Referring again to FIGS. 1-3, upper frame 10 comprises a generally disk-shaped body that includes openings 100 and 102, cutaway sections 104 and 106, and central cavity 112 (FIG. 3) in the lower surface of the upper frame. Openings 100 and 102 extend through the upper frame parallel to sensitive axis SA, and the upper portion of opening 102 includes enlarged area 114 to accommodate a screw head. Cutaway sections 104 and 106 are disposed opposite one another along pendulous axis PA. Both cutaway sections terminate short of the lower surface of upper frame 10, to form rims 108 and 110, respectively. Central cavity 112 is dimensioned to accommodate weight 30. As best shown in FIG. 3, mounting block 24 is fastened directly to upper frame 10, such as by brazing, such that the mounting block occupies a major part of cutaway section 106.

Lower frame 12 is essentially identical to upper frame 10, although in the assembled accelerometer the lower frame is rotated about 180° about hinge axis HA with respet to the upper frame. Lower frame 12 includes openings 120 and 122, cutaway sections 124 and 126 bounded by rims 128 and 130 respectively, and cavity 132 for accommodating weight 32. In the assembled accelerometer, openings 100 and 120 are aligned with opening 90 in reed assembly 14, and openings 102 and 122 are aligned with opening 92 in reed assembly 14. Screws may therefore be passed vertically through these openings to secure the upper and lower frames and reed assembly into a mechanical unit. Opening 120 includes an enlarged area at the lower end of the opening, similar to enlarged area 114 for opening 102. A first screw is therefore passed vertically upward through openings 120, 90 and 100, and a second screw passes vertically downward through openings 102, 92 and 122.

The use of screws rather than welding to hold the accelerometer of the present invention together provides both for easier assembly of the instrument and for greater control of preload force. Openings 100 and 102 are radially symmetric with respect to sensitive axis SA, and are also positioned along a diameter that intersects the centers of mounting pads 46 and 48. The use of two mounting pads is a departure from conventional designs, most of which have used three or more pads to secure a reed assembly between upper and lower stators or frame members. The use of two pads as illustrated in FIGS. 1 and 2 maintains the radial symmetry of the reed assembly. Pads 46 and 48 are elongated in the circumferential direction, but shortened in the radial direction to avoid coupling of any dishing strains due to preloading into the sensing assembly.

Weight 30 includes end 140 that has a reduced width but an increased height with respect to the main body of the weight. The increased height of end 140 is accommodated by cutaway section 104 in upper frame 10. End 140 includes laterally facing mounting surface 142, downwardly extending blade 144, and slightly recessed lower surface 146 (FIG. 3). Blade 144 is dimensioned so as to be compliant along pendulous axis PA. Mounting surface 142 is used to mount end section 35 of crystal 34.

Recessed lower surface 146 cooperates with blade 144 to permit end 140 to be securely mounted on the proof mass through blade 44 while remaining substantially out of contact with the proof mass base, thereby accommodating thermally induced movement along the pendulous axis between these structures without transmitting strain to end 140 or to the proof mass base.

Weight 32 is essentially identical to weight 30, although it is rotated 180° with respect to weight 30 about hinge axis HA. Weight 32 includes end 150 that has a reduced width but an increased height with respect to the main body of the weight. The increased height of end 150 is accommodated by cutaway section 126 in lower frame 12. End 150 includes laterally facing and mounting surface 152, upwardly extending blade 154, and slightly recessed lower surface 156. Mounting surface 152 is used to mount lower end 40 of crystal 38. Recessed lower surface 156 cooperates with blade 154 to permit end 150 to be securely mounted to proof mass base 18 while remaining substantially out of contact with the proof mass base, thereby accommodating thermally induced relative movement.

In the embodiments shown in FIGS. 1-3, weights 30 and 32 and proof mass base 18 are constructed such that the center of mass of proof mass 70 is at the intersection of hinge axis HA and pendulous axis PA. In this embodiment, the translational and rotational motions of the proof mass are substantially uncoupled, in that an acceleration along the sensitive axis produces only translational motion, and differential thermal expansion produces only rotational motion. However, the center of gravity of the proof mass could be relocated to a different position along pendulous axis PA. In such an arrangement, the translational and rotational motions of the proof mass would be coupled, and acceleration along the sensitive axis would result in the translational motion of the proof mass illustrated in FIG. 6, as well as in the rotational movement of the proof mass, as indicated in FIG. 5. For a similar reason, differential thermal expansion of different parts of the accelerometer would also result in mixed translational and rotational movement. In such an accelerometer, the location of the center of mass of the proof mass, and the net translational and rotational compliance of the flexures combined with the force sensing elements, should be chosen so that acceleration of the accelerometer along the sensitive axis results in a combination of translational motion of the proof mass along the sensitive axis and rotational motion of the proof mass about the hinge axis such that the effective axis of rotation of the proof mass (i.e., the axis about which the proof mass begins to rotate in response to acceleration along SA) is external to the proof mass and to anything directly attached to the proof mass, such as the flexures. The result will be an accelerometer in which translational motion along the sensitive axis is the dominant response to an acceleration along such axis. An uncoupled design, with the center of mass of the proof mass coincident with the hinge axis will generally be preferred. Nevertheless, locating the center of gravity off of hinge axis HA, or making the hinge axis of flexures 20 and 22 parallel but not coincident, may be desirable for some applications. For example, it sometimes may be desirable to use dissimilar crystal force transducers in order to achieve good tracking while having output frequencies sufficiently widely separated that they never produce the same frequency at both outputs at the same time. This condition can be achieved while still retaining uncoupled translation in response to acceleration and rotation in response to temperature, if the center of the proof mass is offset to match the center of compliance.

One of the factors that has inhibited the use of quartz crystal force-sensing elements in accelerometers has been the problem of proof mass caging. Quartz crystal force sensors require a comparatively large mass to produce a suitable frequency change in response to acceleration. However, crystalline quartz sensors are quite fragile, and the proof mass to which a given crystal is attached must therefore be constrained or caged, such that an out-of-range acceleration does not damage the crystal. The problem of caging is further complicated by the inevitability of thermal mismatch when crystalline quartz sensors are used. The crystals are quite stiff, and thermal expansion mismatches on the order of two parts per million per degree Celsius will produce a 30%-40% of full scale deflection if compliance allows it. This features makes accurate caging over an extended temperature range difficult, and it has a subtle but important side effect. Lack of accurate caging imposes an added burden of shock tolerance on the flexures, and the sensitivity of the caging problem to thermal mismatches has limited the choice of flexure materials for vibrating beam accelerometers to a small number of metals. However, it has become increasingly clear that the use of metallic flexures is a significant limitation on achievable bias stability of a vibrating beam accelerometer. Fused quartz flexures have demonstrated greatly improved stability, but add a new dimension to the caging problem since the flexures as well as the crystals must be protected from brittle failure due to shock overloads.

The accelerometer of the present invention provides a simple and elegant solution to the caging problem. Referring to FIG. 2, proof mass 70, consisting of weights 30 and 32 and proof mass base 18, is caged along hinge axis HA at shock gaps 160 and 162, and is caged along pendulous axis PA at shock gaps 164, 166, 168 and 170. The width of these shock gaps is exaggerated in FIG. 2, and is typically on the order of 2-3 thousandths of an inch. The edges of annular support 16 and proof mass base 18 at these shocked gaps are preferably gold-plated to minimize contact stresses during shock loading, and to inhibit the generation of static charge. Such gold-plating will generally elmininate the need for metallization on flexures 20 and 22, allowing these flexures to realize their inherently high mechanical stability without compromise. The width of the shock gaps takes into account the fact that the crystals are long and thin, and that the crystal ends can therefore accommodate lateral movements more readily than axial movements.

Caging of proof mass 70 along sensitive axis SA is accomplished by means of shock pads 180 and 182 on the upper surface of the proof mass base to either side of weight 30, and a similar set of shock pads on the lower surface of the proof mass base, directly under pads 180 and 182. Pads 180 and 182 extend to within a few ten-thousandths of an inch of the lower surface of upper frame 10, and the pads on the lower surface of the proof mass base extend to within a similar distance to the upper surface of lower frame 12. Pads 180 and 182 are located along hinge axis HA and are equidistant from pendulous axis PA. The use of pads located along hinge axis HA, in conjunction with crystals 34 and 38 located on opposite sides of the hinge axis from one another, produces a caging arrangement in which the shock stop clearance is constant and independent of temperature.

It will be appreciated from FIGS. 1 and 2 that caging of proof mass 70 is independent of temperature, by reason of the symmetry of the accelerometer elements. An appropriate compliance for shock caging in the plane of the reed assembly, i.e., along the hinge axis, may be conveniently controlled by controlling the compliance of arms 56, 58, 66 and 68 to either side of flexures 20 and 22. In general, for an elastically supported, linearly translational system, the static displacement d is given by:

$$d = 9.8/f_n^2 \text{ pl (inches/g)}$$

where $f_n$ is the resonant frequency. Along the sensitive axis, d and $f_n$ are controlled by the scaling of the accelerometer. Along the hinge axis, there is a choice for $f_n$, as long as the resonant frequency is greater than 2000 Hz, to put if above standard aerospace vibration spectra. Generally, this resonance will be 3000-4000 Hz if everything is made as rigid as possible, giving static displacement d between 0.6 and 1.0 microinches per g. If the flexure strength requires that shear loading be kept to 1000 g equivalent, then caging stops along this axis must be set 0.0006-0.0001 inches, a difficult clearance to achieve in manufacturing. However, if additional compliance is introduced through arms 56, 58, 66, and 68, so that $f_n$ is lowered to 2200 Hz, then the static displacement increases to 2.0 microinches per g, allowing the hinge axis shock stops to be set at 0.002 inches. Clearances of this order can be produced economically and automatically as a byproduct of standard laser cutting operations. Quartz flexures 20 and 22 are quite stiff and therefore limited by their tensile strength when loaded in direct tension, but they can accommodate quite finite displacements by buckling when in compression. The flexure symmetry assures that shocks along pendulous axis PA will always place one flexure in compression, and the buckling limit on the flexure will protect the one in tension by allowing the proof mass 70 to rotate slightly into a stop. The flexure symmetry also couples small rotations about sensitive axis SA to displacement along SA in the normal (linearly elastic) sensing mode, but these rotations are on the order of ten nanoradians at full-scale input and so are easily accommodated.

The clearances appropriate for gas damping of translational movement of the proof mass along sensitive axis SA and rotation of the proof mass about hinge axis HA are nearly an order of magnitude larger than those required for a shock caging along these axes. Such shock caging is therefore provided by shock pads 180 and 182, and the corresponding pads on the lower surface of the proof mass base. These pads are placed on hinge axis HA where they coincide with the center of mass of the proof mass. Since minor mismatches of thermal coefficients of expansion in the structure will be symmetrical with respect to hinge axis HA, they will cause small rotations about hinge axis HA, but no significant translation along the sensitive axis. The functioning of the shock pads will therefore be independent of temperature, even with significant thermal mismatch. This feature provides greater flexibility in the choice of materials, and is one of the characteristics of the accelerometer of the present invention that makes it possible to combine the low temperature coefficient (and the associated great strength) of fused quartz with the relatively high temperature coefficient of crystalline quartz.

The flexure motions required to accommodate the principal degrees of freedom of the proof mass have already been described with respect to FIGS. 5 and 6. It is to be noted that the motion of the effective hinge axis HA relative to the center of mass is either zero, in the rotational mode shown in FIG. 5 or very small in the translational mode shown in FIG. 6. In either case, the motion will produce, in response to a cross axis input, only a torque that is a common mode signal rejected by the frequency difference processing diagrammed in FIG. 9. The geometric errors that must be of concern are those which produce forces along the sensitive axis. There is such a force in the case of rotation since a side force tending to compress an up-tilted flexure and stretch a down-tilted flexure will produce a net upward force on both sides of the proof mass. The result is a slight shift in apparent alignment, which is comparable to the actual small angle and is an easily modeled function of temperature. In the case of translational movement of the proof mass, a cross axis input along either HA or PA will tend to lift one flexure slightly and push the other down slightly. Conventional cross-coupling terms therefore are subject to first-order cancellation.

Dual crystal compensation of vibration rectification coefficient (VRC) effects caused by force crystal non-linearities is made to be accurate and automatic in the accelerometer of the present invention, because the crystals are attached to a common proof mass. Identify of dynamic inputs to the crystals, which assures good VRC cancellation, requires only that the rotational natural frequency of the proof mass be much higher than its translational natural frequency. This condition is easily assured by placing the force crystals near the edes of the proof mass, so that their radius from the center of the proof mass is substantially greater than the radius of gyration.

The accelerometer of the present invention can in general be fabricated using steps well known to those skilled in the art. For example, quartz reed assembly 14 may be fabricated from a unitary piece of fused or amorphous quartz, using techniques that are well developed in the art relating to closed loop accelerometers. See for example, U.S. Pat. No. 4,394,405. Similarly, force sensing crystals 24 and 38 are known elements that have previously been used in connection with closed loop accelerometers and other force-sensing devices. Once the individual parts of the accelerometer of the present invention have been fabricated, the accelerometer undergoes a final assembly in which the weights are joined to the proof mass base, the reed assembly is secured between the uppe and lower frames, and finally force-sensing crystals 34 and 38 are attached to weights 30 and 32 and to mounting blocks 24 and 26 by means of a suitable adhesive such as an epoxy adhesive.

During the final assembly, it is important to maintain the proof mass base in exact alignment within annular support 16 along two axes. Such exact alignment is important for achieving symmetry of the air-damping gaps, for achieving predetermined tolerances between the shock stops and the upper and lower frames, and to insure that there is no twist between the ends of the crystals. Permitting the proof mass to translate along sensitive axis SA during final assembly compromises all three of these design features. If such translation occurs, the bias, vibration rectification, and linearity of the accelerometer will be adversely affected. If the proof mass is permitted to rotate during attachment of the crystals, the crystals cannot be properly attached to the weights and mounting blocks. Furthermore, when the proof mass is rotated, the effectiveness of the shock stop feature is negated, leaving the sensor vulnerable to high shock inputs.

Quartz reed assembly 14 does not include any built-in alignment characteristics that are useful at the final assembly stage. Because any misalignment along either the translation or rotation axis is unacceptable, suitable means must be devised for fixing the proof mass in place while the crystals are attached. Although various shimming techniques could be devised, applicants have discovered that a much preferable method involves the use of temporary bridges between the proof mass base and the surrounding annular support.

Figure 10:
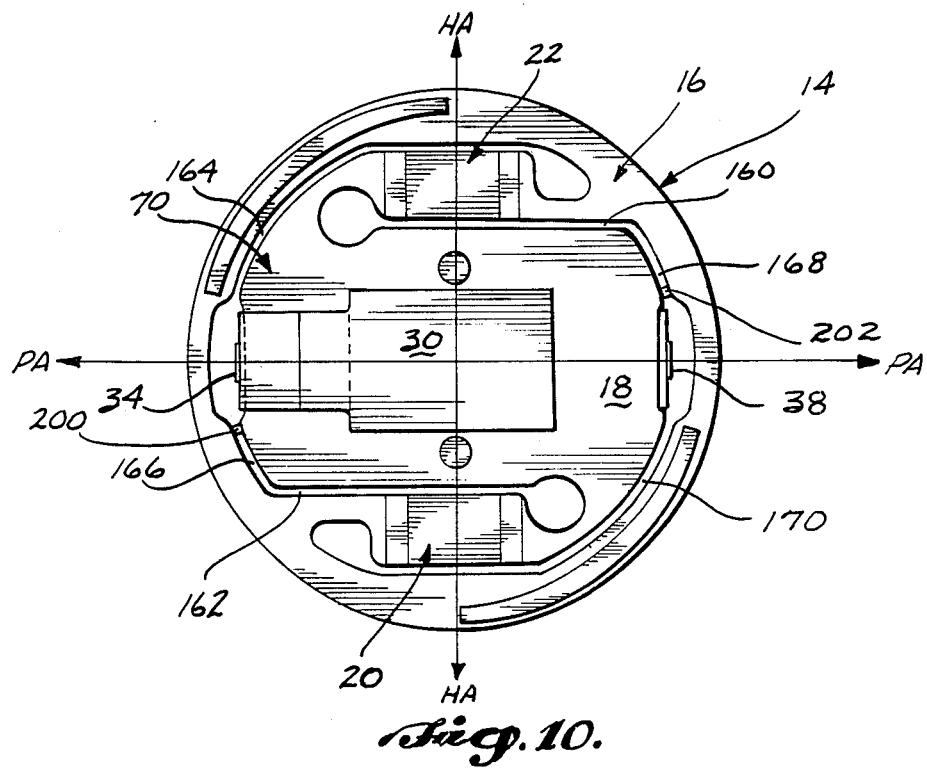
FIG. 10 is a top plan view of the reed assembly showing the bridges.
Figure 11:
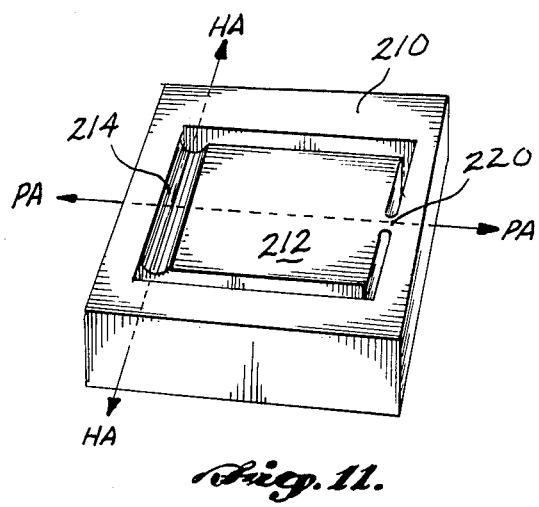
FIG. 11 is a perspective view of a single degree of freedom accelerometer showing a bridge.
Figure 12:
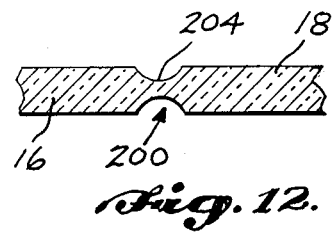
FIG. 12 is a partial cross-sectional view of a bridge comprising fused quartz.
Figure 13:
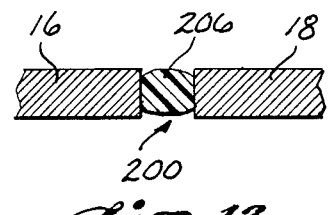
FIG. 13 is a partial cross-sectional view of a bridge composed of an adhesive substance.

The concept of a bridge is illustrated in FIG. 10 for the accelerometer of the present invention, and in FIG. 11 for a conventional single degree of freedom accelerometer. In FIG. 10, the width of shock gaps 160, 162, 164, 166, 168 and 170 are greatly exaggerated for the purpose of illustration. As shown in FIG. 10, two bridges 200 and 202 are formed between proof mass base 18 and annular support 16. For an accelerometer such as the accelerometer of the present invention, wherein the proof mass base and annular rim are fabricated from a unitary amorphous quartz structure, bridges 200 and 202 are preferably formed during fabrication of quartz reed assembly 14 by leaving quartz material 204 between the proof mass base and support, as illustrated in FIG. 12. Alternately, as shown in FIG. 13, the bridges could be formed by means of a suitable substance 206, such as epoxy, that spans the shock gap between the support and proof mass base. In the acelerometer shown in FIG. 10, the bridges are preferably located on opposite sides of hinge axis HA and pendulous axis PA from one another, preferably closer to the pendulous axis, such that a line between the bridges is substantially perpendicular to the hinge axis. For example, if one bridge spanned shock gap 164, 166 or 162, then the other bridge would span shock gap 170, 168 or 160, respectively. In a preferred embodiment, the bridges are positioned exactly opposite one another with respect to the point of intersection of the hinge and pendulous axes, as shown in FIG. 10. The bridges are maintained throughout the process of quartz reed assembly 14, including the etching and laser trim operations. The bridges remain through the subassembly of reed assembly 14 (i.e., attachment of weights 30 and 32), and are still intact during the final asembly of the accelerometer components. Only after force-sensing crystals 34 and 36 have been mounted with a suitable adhesive, and the adhesive cured, are the bridges removed. One suitable method of removing the bridges is to use a laser, such as a carbon dioxide laser, to melt back each bridge in a stress-free manner. Access of the laser beam to the bridges can be via cutaway sections 104 and 106 in upper frame 10, or via cutaway sections 124 and 126 in lower frame 12. By retaining the bridges through assembly, the proof mass is naturally aligned relative to the support in its initial state. The uniformity of the etching process assures nearly perfect alignment by this method.

FIG. 11 schematically illustrates a conventional open loop accelerometer comprising frame 210 and proof mass 212 connected by flexure hinge 214. Flexure 214 permits a single degree of freedom of proof mass 212, i.e., rotation, about hinge axis HA. A force-sensing crystal is connected between the proof mass and an extension of frame 210, to measure the force resulting from acceleration of proof mass along the sensitive axis of the accelerometer. As illustrated in FIG. 11, for a single degree of freedom proof mass, a single bridge 220 is sufficient, the bridge being formed between proof mass 212 and frame 210 along pendulous axis PA. Because single degree of freedom acelerometers are typically not fabricated from amorphous quartz, bridge 220 would preferably be formed by means of epoxy or other suitable substances, as indicated in FIG. 13.

While the preferred embodiments of the invention have been illustrated and described, it should be understood that variations will be apparent to those skilled in the art. For example, crystals 34 and 38 could comprise conventional single beam rather than dual beam force crystals. Flexures 20 and 22 could be made of materials other than fused quartz, e.g., crystalline quartz, metal, metallic glass, or ceramic. Each of these substances would provide a tradeoff between performance and ease of manufacture. As another example, the accelerometer of the present invention may be used to measure angular acceleration. In such an arrangement, processor 82 shown in FIG. 9 would determine the angular acceleration as a function of the sum of frequencies $f_1$ and $f_2$ rather than a function of the differences of the frequencies. As another example, only a single weight can be used, rather than dual weights 30 and 32 of the illustrated embodiment. Although a single weight embodiment would have a reduced parts count, its output would in most cases include a significant misalignment term related to the mismatch of second order nonlinearities. Accordingly, the invention is not to be limited to the specific embodiments illustrated and described, and the true scope and spirit of the invention are to be determined by reference to the following claims.

The embodiments of the invention in which an exclusive property or privilege is claimed are defined as follows:

1. An accelerometer for measuring acceleration along a sensitive axis, comprising:
   a body:
   a proof mass;
   mounting means for mounting the proof mass to the body, the mounting means comprising first and second flexures connected to the proof mass and arranged to permit substantially uncoupled translational and rotational motion of the proof mass with respect to the body such that the translational motion is along the sensitive axis and such that the rotational motion is about a single hinge axis perpendicular to the sensitive axis, the first and second flexures being positioned on opposite sides of a pendulous axis that is normal to the hinge axis and to the sensitive axis and that passes through the center of mass of the proof mass, each flexure having a hinge axis aligned along said single hinge axis, whereby acceleration ofthe accelerometer along the sensitive axis results in said translational motion of the proof mass along the sensitive axis; and
   sensing means for reacting to said translational motion by producing a signal indicative of acceleration along the sensitive axis.

2. The accelerometer of claim 1, wherein each flexure comprises a leaf flexure formed so as to undergo angular bending as a result of rotation of the proof mass about the single hinge axis, and so as to undergo S-bending as a result of translation of the proof mass along the sensitive axis.

3. The accelerometer of claim 2, wherein the mounting means further comprises a support, and wherein each flexure comprises a leaf member extending between the support and the proof mass, the leaf members of the flexures lying in a common plane normal to the sensitive axis and parallel to the single hinge axis.

4. The accelerometer of claim 1, wherein the mounting means further comprises a support, wherein the first flexure extends from a first point of connection to the support to a first point of connection to the proof mass in a first direction along the pendulous axis, and wherein the second flexure extends from a second point of connection to the support to a second point of connection to the proof mass in a second direction along the pendulous axis opposite to the first direction.

5. The accelerometer of claim 4, wherein each flexure comprises a leaf flexure formed so as to undergo angular bending that results in rotation of the proof mass about the single hinge axis, and so as to undergo S-bending that results in translation of the proof mass along the sensitive axis.

6. The accelerometer of claim 5, wherein each flexure comprises a leaf member extending between the support and the proof mass, the leaf members of the flexures lying in a common plane normal to the sensitive axis.

7. The accelerometer of claim 4, wherein the flexures are radially symmetric with respect to a point between the flexures.

8. The accelerometer of claim 4, wherein the proof mass is symmetric along any line passing through a center of the proof mass.

9. The accelerometer of claim 1, wherein the sensing means comprises first and second force sensing elements between the body and the proof mass, the first and second force sensing elements being connected to the proof mass at respective first and second connection points, the first and second connection points being located on opposite sides of the single hinge axis from one another.

10. The accelerometer of claim 9, wherein the force sensing elements are connected such that differential thermal expansion and contraction of the force sensing elements with respect to the other components of the accelerometer results primarily in rotation of the proof mass about the single hinge axis.

11. The accelerometer of claim 10, wherein the first force sensing element extends from the first connection point in one direction along the sensitive axis, and wherein the second force sensing element extends from the second connection point in a direction opposite to that of the first force sensing element.

12. The accelerometer of claim 11, wherein each force sensing element is a vibrating beam force transducer.

13. The accelerometer of claim 12, wherein each force sensing element comprises a double-ended tuning fork.

14. The accelerometer of claim 13, wherein the proof mass comprises a proof mass base, wherein the mounting means further comprises a support, wherein each flexure extends between the proof mass base and the support, and wherein the support, flexures and proof mass base comprise a unitary, fused quartz structure.

15. The accelerometer of claim 14, wherein the proof mass further comprises weights positioned on opposite sides of the proof mass base from one another.

16. The accelerometer of claim 9, wherein the first and second connection points lie along the pendulous axis.

17. The accelerometer of claim 16, wherein the center of gravity of the proof mass is positioned midway between the connection points.

18. The accelerometer of claim 9, wherein the proof mass is characterized by a center and a radius of gyration, and wherein the force sensing elements are attached to the proof mass at connection points that are spaced from the center by a distance greater than the radius of gyration.

19. The accelerometer of claim 16, further comprising upper and lower frames between which the mounting means is supported, wherein the proof mass has upper and lower surfaces on which shock pads are positioned, each shock pad being positioned between the first and second connection points, such that rotation of the proof mass about the single hinge axis does not significantly vary the distance between each shock pad and the frame adjacent thereto.

20. The accelerometer of claim 1, wherein the flexures comprise fused quartz.

21. The accelerometer of claim 1, wherein the proof mass comprises a proof mass base, wherein the mounting means further comprises a support, wherein each flexure extends between the proof mass base and the support, and wherein the accelerometer further comprises upper and lower frames between which the support is fastened.

22. The accelerometer of claim 21, wherein the support comprises a ring encircling the proof mass base, the ring having an upper surface in which two upper mounting pads are formed, and a lower surface on which two lower mounting pads are formed, the upper and lower mounting pads being directly above and below one another, the upper and lower mounting pads being adapted to abut the upper and lower frames, respectively, to secure the support between the frames.

23. The accelerometer of claim 22, wherein each mounting pad is relatively elongated in a circumferential direction and relatively narrow in a radial direction.

24. The accelerometer of claim 23, wherein the two upper mounting pads are radially symmetric with respect to one another, and form the only point of contact between the support and the upper frame, and wherein the lower mounting pads are radially symmetric with respect to one another, and form the only points of contact between the support and the lower frame.

25. The accelerometer of claim 24, wherein the upper and lower mounting pads do not intersect either the single hinge axis or the pendulous axis.

26. The accelerometer of claim 1, wherein the mounting means further comprises a support and an outer and inner arm for each flexure, each outer arm being connected between the support and the respective flexure, each inner arm being connected between the respective flexure and the proof mass, each arm being compliant about an axis parallel to the sensitive axis.

27. The accelerometer of claim 1, wherein the proof mass comprises a proof mass base and a weight secured thereto, one end of the weight being secured to the proof mass base through a compliant attachment element.

28. The accelerometer of claim 27, wherein the attachment element is compliant along the pendulous axis.

29. The accelerometer of claim 28, wherein the attachment element comprises a plate oriented normal to the pendulous axis.

30. The accelerometer of claim 1, wherein the sensing means comprises first and second force sensing elements connected between the body and the proof mass, each force sensing element comprising a vibrating beam force transducer, the first and second force sensing elements being connected to the proof mass at respective first and second connection points located on opposite sides of the single hinge axis from one another, the first force sensing element extending from the first connection point in one direction along the sensitive axis, and the second force sensing element extending from the second connection point in a direction opposite to that of the first force sensing element, the first and second force sensing elements including means for producing respective first and second output signals indicative of the force on the force sensing elements, the sensing means further comprising processing means for producing a signal indicative of acceleration along the sensitive axis as a function of the difference between the first and second output signals, and for producing a signal indicative of angular acceleration as a function of the sum of the output signals.

31. An accelerometer for measuring acceleration along a sensitive axis, comprising:
 a body;
 a proof mass;
 mounting means for mounting the proof mass to the body, the mounting means comprising first and second flexures connected to the proof mass and arranged to permit translational motion of the proof mass with respect to the body along the sensitive axis and rotational motion of the proof mass with respect to the body about a single hinge axis perpendicular to the sensitive axis, the first and second flexures being positioned on opposite sides of a pendulous axis that is normal to the hinge axis and to the sensitive axis and that passes through the center of mass of the proof mass, the first and second flexures each having a hinge axis aligned along said single hinge axis, the center of mass of the proof mass being offset from the single hinge axis, the location of the center of mass of the proof mass and the net translational and rotational compliance of the mounting means being chosen so that acceleration of the accelerometer along the sensitive axis results in a combination of translational motion of the proof mass along the sensitive axis and rotational motion of the proof mass about the single hinge axis, such that the effective axis of rotation of the proof mass is external to the proof mass and to all structures directly attached to the proof mass, such as the flexures; and
 sensing means for reacting to said translational motion by producing a signal indicative of acceleration along the sensitive axis.

32. An accelerometer for measuring acceleration along a sensitive axis, comprising:
 a body;
 a proof mass;
 mounting means for mounting the proof mass to the body, the mounting means comprising first and second flexures connected to the proof mass and arranged to permit translational motion of the proof mass with respect to the body along the sensitive axis and rotational motion of the proof mass with respect to the body about a hinge axis perpendicular to the sensitive axis, the first and second flexures being positioned on opposite sides of a pendulous axis that is normal to the hinge axis and to the sensitive axis and that passes through the center of mass of the proof mass, whereby acceleration of the accelerometer along the sensitive axis results in a combination of translational motion of the proof mass along the sensitive axis and rotational motion of the proof mass about the hinge axis; and
 sensing means for reacting to said translational motion by producing a signal indicative of acceleration along the sensitive axis, th sensing means comprising first and second force sensing elements connected between the body and the proof mass, the first and second force sensing elements being connected to the proof mass at respective first and second connection points, the first and second connection points being located on opposite side of the hinge axis from one another.

33. The accelerometer of claim 32, wherein each flexure comprises a leaf flexure formed so as to undergo angular bending as a result of of rotation of the proof mass about the single hinge axis, and so as to undergo S-bending as a result of the translation of the proof mass along the sensitive axis.

34. The accelerometer of claim 32, wherein the mounting means further comprises a support, wherein the first flexure extends from a first point of connection of the support to a first point of connection to the proof mass in a first direction along the pendulous axis, and wherein the second flexure extends from a second point of connection to the support to a second point of connection to the proof mass in a second direction along the pendulous axis opposite to the first direction.

35. The accelerometer of claim 32, wherein the flexures comprise fused quartz.

36. The accelerometer of claim 32, wherein the proof mass comprises a proof mass base, wherein the mounting means further comprises a support, wherein each flexure extends between the proof mass base and the support, and wherein the accelerometer further comprises upper and lower frames between which the support is fastened.

37. The accelerometer of claim 32, wherein the distance between the first connection point and the hinge axis is different from the distance between the second connection point and the hinge axis.

38. A method of assembling an accelerometer that is adapted for measuring acceleration along a sensitive axis, the method comprising:
 forming at least two bridges between a proof mass and a body that comprise the accelerometer, said body including upper and lower frames, the accelerometer further comprising two force sensing elements connected between the body and the proof mass, and mounting means for mounting the proof mass to the body using flexures that are arranged to permit both translational and rotational motion of the proof mass with respect to the body, the mounting means permitting: (a) rotation of the proof mass with respect to the body about a single hinge axis that is aligned with a hinge axis of each of the flexures and is perpendicular to the sensitive axis, and (b) translational motion of the proof mass with respect to the body along the sensitive axis;

assembling the accelerometer, the assembly step including the step of securing the mounting means between the upper and lower frames;
attaching the force sensing elements to the proof mass and body; and
removing both bridges.

39. The method of claim 38, wherein the bridges are formed on opposite sides of a single hinge axis from one another, such that a line between the bridges is substantially perpendicular to the single axis.

40. The method of claim 38, wherein the bridges, mounting means, and at least portions of the body and proof mass are formed from a single piece of amorphous quartz, and wherein each bridge extends between said proof mass portion and said body portion.

* * * * *

UNITED STATES PATENT AND TRADEMARK OFFICE
CERTIFICATE OF CORRECTION

PATENT NO. : 4,872,342
DATED : October 10, 1989
INVENTOR(S) : Hanson et al.

It is certified that error appears in the above-identified patent and that said Letters Patent is hereby corrected as shown below:

Title page:

Section [21], Line 1  "Appl. No.: 222,680" should be —Appl. No.: 223,680—
Section [57], Line 3  "strucutre" should be —structure—

| Column | Line(s) | |
|---|---|---|
| 1 | 66 | "forces" should be —force— |
| 2 | 34 | "soluton" should be —solution— |
| 2 | 46 | "resonante" should be —resonate— |
| 2 | 57 | "treatng" should be —treating— |
| 2 | 63 | "repsonse" should be —response— |
| 3 | 1 | "microinches" should be —micro inches— |
| 4 | 40 | "sections" should be —section— |
| 4 | 55 | "asembly" should be —assembly— |
| 5 | 13 | "rsepect" should be —respect— |
| 5 | 66 | "bas" should be —base— |
| 6 | 8 | "drawings" should be —drawing— |
| 6 | 59 | "Thus" should be —Thus,— |
| 6 | 68 | "$\alpha$is" should be —$\alpha$ is— |
| 7 | 13 | "there" should be —these— |
| 7 | 64 | "pick-up" should be —pick-off— |
| 8 | 28 | "respet" should be —respect— |
| 9 | 3 | "44" should be —144— |
| 10 | 19 | "features" should be —feature— |
| 10 | 44 | "shocked" should be —shock— |
| 11 | 13-15 | "$d = 9.8/f_n 2pl\ (inches/g)$" should be —$d = \dfrac{9.8}{f_n^2}\ (inches/g)$— |

UNITED STATES PATENT AND TRADEMARK OFFICE
CERTIFICATE OF CORRECTION

PATENT NO. : 4,872,342                         Page 2 of 2

DATED : October 10, 1989

INVENTOR(S) : Hanson et al.

It is certified that error appears in the above-identified patent and that said Letters Patent is hereby corrected as shown below:

| Column | Line(s) | |
|---|---|---|
| 11 | 43-44 | "displacement" should be —displacements— |
| 12 | 20 | After "small" insert the word —rotation— |
| 12 | 30 | "Identify" should be —Identity— |
| 12 | 36 | "edes" should be —edges— |
| 12 | 53 | "uppe" should be —upper— |
| 13 | 34 | "acelerometer" should be —accelerometer— |
| 13 | 46 | "process" should be —processing— |
| 13 | 50 | "asembly" should be —assembly— |
| 14 | 8 | "acelerometers" should be —accelerometers— |
| 14 | 26 | "differences" should be —difference— |
| 14 | 59 (Claim 1) | "ofthe" should be —of the— |
| 15 | 36 (Claim 9) | After "elements" insert —connected— |
| 18 | 14 (Claim 32) | "th" should be —the— |
| 18 | 20 (Claim 32) | "side" should be —sides— |
| 18 | 24 (Claim 33) | After "of" delete second occurrence "of" |
| 18 | 31 (Claim 34) | "of" should be —to— |
| 19 | 8 (Claim 39) | "a" should be —the— |

Signed and Sealed this

Second Day of October, 1990

*Attest:*

HARRY F. MANBECK, JR.

*Attesting Officer*        *Commissioner of Patents and Trademarks*